Figure 1:
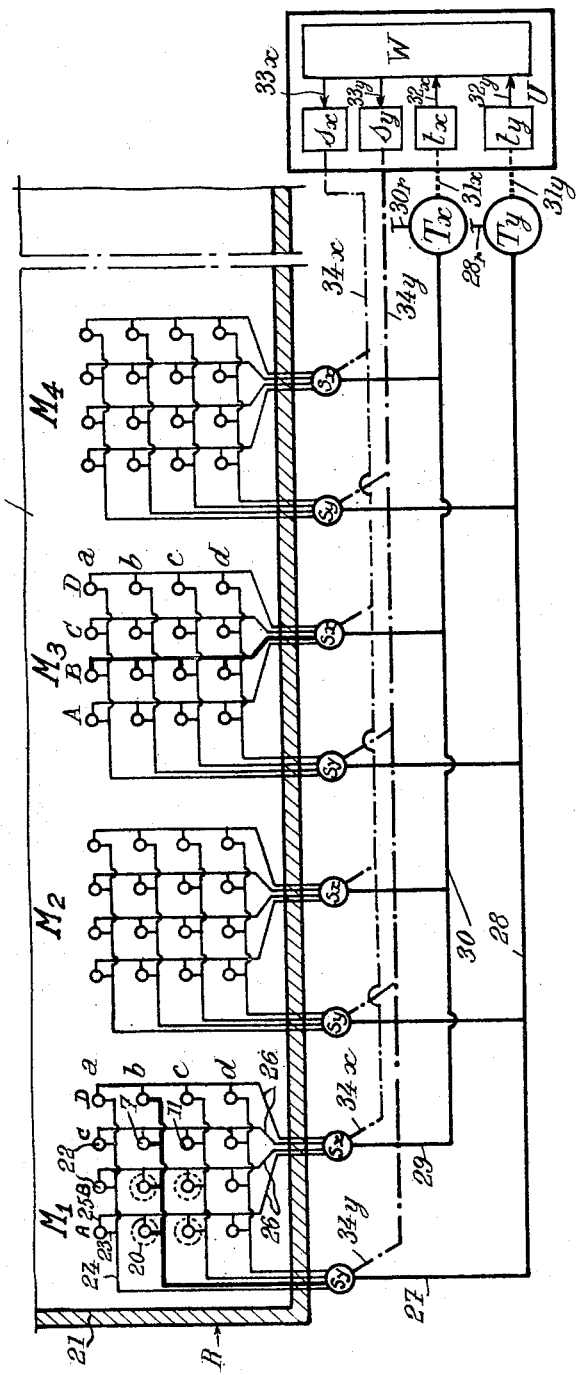

Dec. 15, 1964  R. DONGUY ETAL  3,161,569
METHODS AND DEVICES FOR DETECTING THE PRESENCE
OF FISSION PRODUCTS IN THE COOLANT FLUID
STREAMS OF A NUCLEAR REACTOR
Filed Nov. 30, 1960  3 Sheets-Sheet 1

United States Patent Office 3,161,569
Patented Dec. 15, 1964

3,161,569
METHODS AND DEVICES FOR DETECTING THE PRESENCE OF FISSION PRODUCTS IN THE COOLANT FLUID STREAMS OF A NUCLEAR REACTOR
René Donguy, Vanves, and Jean Megy, Bourg-la-Reine, France, assignors to Commissariat a l'Energie Atomique, Paris, France
Filed Nov. 30, 1960, Ser. No. 72,662
Claims priority, application France Dec. 2, 1959
4 Claims. (Cl. 176—19)

The present invention has for its object a method and a device for permanently supervising, with a reduced number of conduits, of switching elements and of radioactivity detectors, the radioactivity level in fluid streams serving to cool fuel elements housed in the channels of a heterogeneous nuclear reactor, in order quickly to detect a possible burst of cans surrounding said fuel elements.

It is known that, in heterogeneous nuclear reactors, the fuel elements of fissionable or fertile material (for instance uranium, possibly enriched with the U 235 isotope), which have a tendency to be heated under the effect of the neutron bombardment which takes place in the reactor, are cooled by the circulation of a coolant fluid (consisting of a gas, such as carbonic acid gas, or of a liquid, such as water) circulating in the channels where these elements are housed. In order to separate the fuel elements from the coolant fluid—to avoid, on the one hand a reaction between the coolant fluid and the fissionable or fertile material and, on the other hand, the passage of fission products (created in the fuel elements under the effect of the neutron bombardment) into the coolant fluid—every fuel element is surrounded by a gas-tight can (made for instance of magnesium or a magnesium and aluminum alloy).

In order to avoid any accident which might have serious consequences, it is necessary to detect any deterioration (such as a crack) of a can surrounding a fuel element before this deterioration has become important.

Among the known methods to detect a possible burst of cans surrounding respective fuel elements, some are based upon the determination of the presence of fission products (which are radioactive) in the coolant fluid streams issuing from the channels of the reactor after they have been in contact with the fuel elements.

Since heterogeneous nuclear reactors, and in particular reactors moderated by means of graphite and cooled by means of a gas (such as the Calder Hall reactors in Great Britain and the Marcoule reactors in France) comprise a very great number of channels (of the order of one thousand), it is practically impossible individually to supervise every gaseous stream issuing from a reactor channel by means of a detector (for instance of a radioactivity detector selectively sensitive to radioactive fission products). This is why various methods have been considered up to the present time to group gaseous or liquid effluents collected (by means of collecting tubes) from the coolant fluid streams issuing from the respective channels of a nuclear reactor. The general practice is to send, by means of channels and switching elements (such as valves and selectors), successively the effluents collected from the different channels of a group of channels or from a group of sets of channels to a single radioactivity detector (every set may include about 4 or 5 channels and every group some tens of channels or of sets).

The present invention is concerned with a new grouping of these effluents which makes is possible quickly and efficiently to detect when the normal radioactivity threshold is exceeded in the effluents of a multichannel heterogeneous nuclear reactor by means of a reduced number of conduits (in particular of conduits passing through the gastight shield under pressure where the nuclear reactor proper is housed), of switching means and of radioactivity detectors.

For this purpose, first, as described in the prior French Patent No. 1,246,247 (hereinafter called Patent No. 1), filed by the assignee on October 3, 1959, and to which corresponds the patent application filed in this country on September 14, 1960, under Ser. No. 56,016, the tubes for collecting the fluid streams issuing from the channels of a heterogeneous nuclear reactor are grouped in square matrices, that is to say in systems which may be represented by a geometric configuration of $n$ lines and $n$ columns of collecting tubes ($n$ being an integer) and, for every matrix, every collecting tube is made to open into two distinct collecting channels, hereinafter called respectively line collecting channel and column collecting channel. All the line collecting channels of every line of tubes are made to lead to a line header pipe, whereas all the column collecting channels of every column of tubes are made to lead to a column header pipe, and all the line header pipes are connected to a line selector element adapted to place all the line header pipes successively in communication with a line output channel, whereas all the column header pipes are connected with a column selector element capable of placing all the column header pipes successively in communication with a column output channel.

Such a grouping permits of supervising the radioactivity level of the fluid streams issuing from the different channels of the nuclear reactor and consequently of detecting a possible can burst in a reactor channel (which produces an increase of the radioactivity of the fluid stream issuing from this channel), by determining, by means of two radioactivity detectors, respectively a line radioactivity detector and a column radioactivity detector, the radioactivity in the line output channel and the column output channel respectively, and by switching at regular intervals the two selector elements, so as to localize the collecting tube by determination of the line and of the column to which this tube belongs, by detection of an excess of radioactivity both in the corresponding line header pipe end column header pipe. However, a safe detection of burst cans is possible, with such a matrix grouping, only if a balancing of the fluid collections for the whole of the channels for the various conditions of operation of the reactor is obtained, by equalizing the outputs, on the one hand in the various line collecting channels and column collecting channels, and on the other hand in the various line and column header pipes. The above mentioned patent describes how such a balancing can be obtained for practical purposes, to wit by providing every collecting channel and every header pipe with a material element having for its effect to introduce, into the fluid stream that flows therethrough, an elementary pressure drop of predetermined value and which is preferably uniform.

As above indicated, in the prior patent there was provided, for every matrix, a pair of radioactivity detectors (one on the line output channel and one on the column output channel), in addition to the possible auxiliary radioactivity detectors for continuous supervising of a defective channel and/or for replacing the main detectors, in case of failure of one of them.

The object of the present invention is to reduce the number of radioactivity detectors necessary for supervising the radioactivity level of the coolant fluid streams issuing from the numerous channels of a heterogeneous nuclear reactor by means of matrix-like grouping of the collecting tubes as above described.

For this purpose, the invention has for its object a method and a device.

The method is characterized by the fact of grouping several matrices of collecting tubes which are connected as follows; on the one hand, all the line output channels of all the matrices of the group are connected to a single line channel feeding a line fission product detector, and on the other hand all the column output channels of all the matrices of the group are connected to a single column channel feeding a column fission product detector; and under normal working conditions all the line selector elements and the column selector elements are switched so as to connect, on the one hand, every line header pipe of the matrices of the group successively with said single line channel, and, on the other hand, every column header pipe of the matrices of the group successively with said single column channel.

According to the present invention, the device for carrying out such a method comprises: a single line channel connected to all the line output channels of all the matrices of a group of matrices; a single column channel connected to all the column output channels of all the matrices of the group; a line detector capable of measuring the concentration of fission products in said single line channel; a column detector capable of measuring the concentration of the fission products in said single column channel; line cyclic switching means capable, when actuated by a control impulse, of switching the whole of said line selector elements to place in communication the next line header pipe with the line output channel associated therewith; column cyclic switching means capable, when actuated by a control impulse, of switching the whole of said column selector elements to bring the next column header pipe in communication with the associated column output channel; a synchronizing clock supplying control pulses at regular time intervals; a first and a second control transmission circuit, the first of which connected between said clock and said line cyclic switching means, and the second connected between said clockwork and said column cyclic switching means and normally biased so as to transmit said control pulses to each of said cyclic switching means; and a first and a second control circuit actuated by the line detector and the column detector, respectively, and capable, in response only to a first signal indicative of the overstepping of the fission product concentration threshold produced by the associated detector, of controlling the first and the second controlled transmission circuits, respectively, so as to stop the transmission, toward the associated transmission circuit, of said control pulses.

Furthermore, this device advantageously comprises indicator means capable of indicating, at any time, which line header pipe is actually selected by the line selector and which column header pipe is actually selected by the column detector, and also which line and column header pipes have produced an overstepping of the fission product concentration threshold.

In the preferred embodiment there is effected, in every group of matrices (or in a single group of matrices) of the reactor, simultaneously a line by line scanning in a first matrix of the group and a column by column scanning in another matrix of the group offset with respect to the first by a number of matrices substantially equal to one half of the total number of the matrices in the group, in such manner as to supervise the whole of the matrices of the group in a time which is substantially one half of that which would be necessary if use were made, either of a single detector for the group, or of two detectors but simultaneously supervising the same matrix of the group (one of the detectors line by line and the other detector column by column).

Preferred embodiments of the present invention will be hereinafter described with reference to the accompanying drawings, given merely by way of example and in which:

FIG. 1 diagrammatically illustrates the method according to the invention for detecting possible can bursts in a heterogeneous nuclear reactor including a great number of channels in each of which there is provided a collecting tube, a single group of collecting tubes distributed among several square matrices having been shown for the sake of simplicity.

Figure 2:
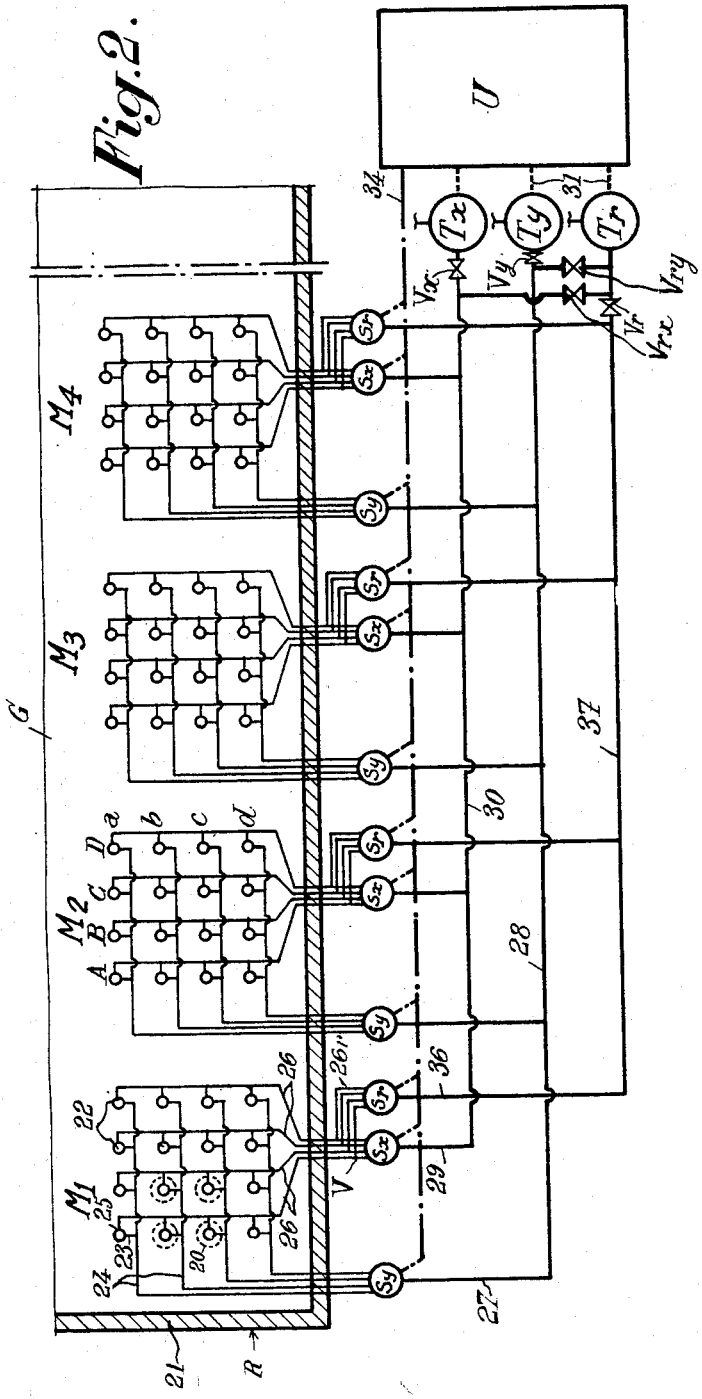

FIG. 2 shows a modification of the method according to FIG. 1, in which there is provided an auxiliary detector capable, on the one hand of continuously supervising a channel where a can burst has occurred and, on the other hand, of acting as an emergency detector.

Figure 3:
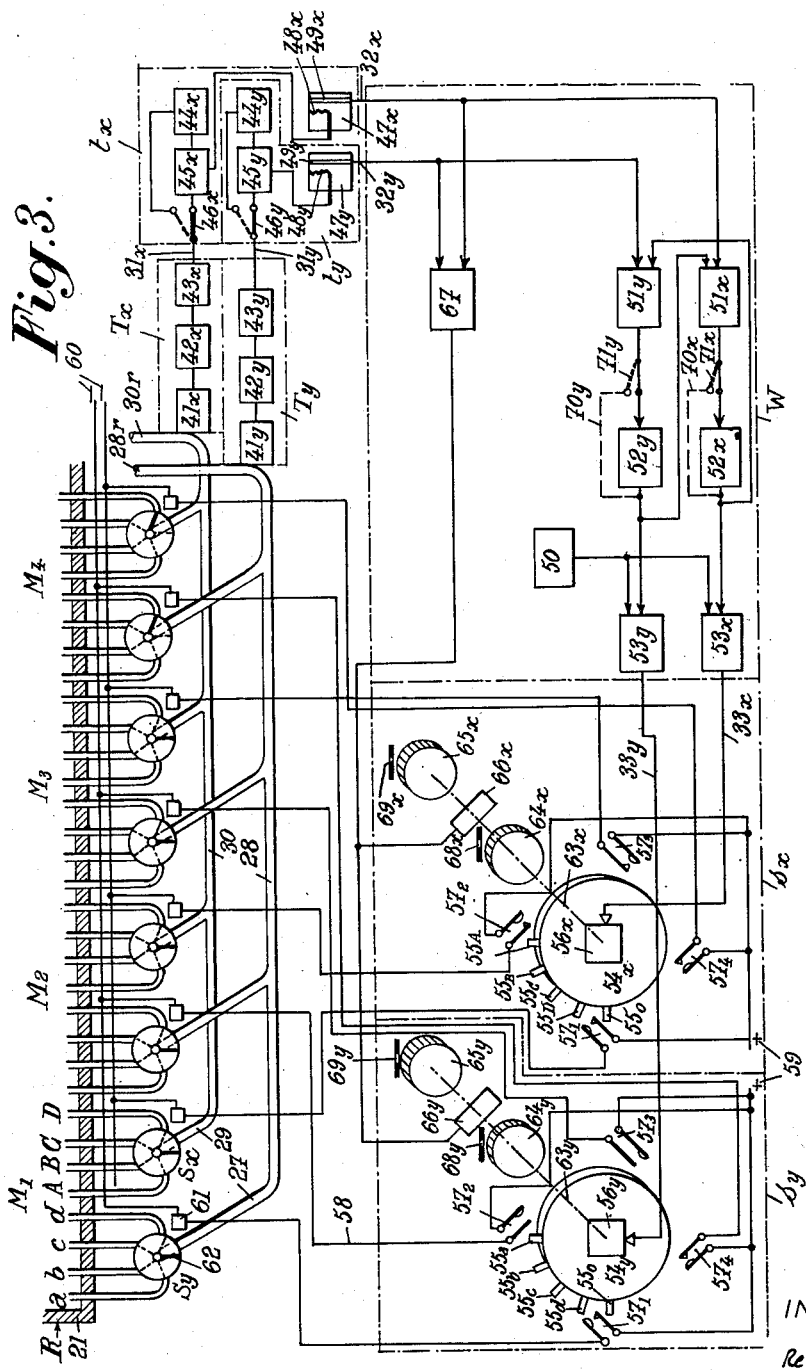

FIG. 3 diagrammatically shows a preferred embodiment of a device for carrying out the method illustrated by FIG. 1.

Referring first to FIG. 1, it shows a portion of the shield 21 under pressure of a heterogeneous nuclear reactor R (for instance moderated by means of graphite and cooled by means of a gas) including a multiplicity of channels 20 (only some of which have been shown) in which are housed the fuel elements (either natural uranium or uranium enriched in the U235 isotope) and through which flows a coolant fluid (for instance carbonic acid gas under pressure). A more complete illustration of such a reactor will be found in the Belgian Patent No. 572,142, filed by the assignee on October 17, 1958 (hereinafter called "Patent No. 2") and corresponding to U.S. patent application Ser. No. 769,222, now abandoned, filed October 23, 1958.

The collecting tubes 22, which collect, in the known manner, a fraction of the coolant fluid issuing from each of the channels 20 of the reactor, are distributed to form groups (according to the number of channels of the reactor) only one of which (group G) is shown by FIG. 1.

Every group is in turn divided into a number $p$ of square matrices $M_1$, $M_2$, $M_3$, $M_4$ (for instance $p=4$) comprising each $n$ lines ($a$, $b$, $c$, $d$) and $n$ columns (A, B, C, D) of collecting tubes 22 (in the drawing $n=4$, but of course $n$ may be different from $p$). It will be noted that if from the point of view of economy of elements it is more advantageous to have $n$ as high as possible in a matrix, on the other hand accuracy of detection decreases when $n$ increases, because the detection is concerned with $n$ collections of fluid and the increase of the concentration in fission products in a collected fluid is more difficult to detect among a great number of collected samples, due to the errors, in particular statistical and background noise errors, inherent in a measurement of fission product radioactivity. This is why, as a rule, $n$ ranges from 6 to 10.

In every matrix M, each of the collecting tubes 22 leads to two distinct collecting channels one of which is indicated by reference 23 and is connected to a line header pipe 24 whereas the second one, designated by 25, is connected to a column header pipe 26.

The line header pipes 24 of a given matrix lead to a line selector element $S_y$ adapted selectively to connect each of the line header pipes 24 (or none of these header pipes) with a line output channel 27, whereas the column header pipes 26 of a given matrix likewise lead to a column selector element $S_x$ adapted selectively to connect every column header pipe 26 (or none of these header pipes) with a column output channel 29.

The present invention is characterized by the following features:

All the output channels 27 of the line selectors $S_y$ of all the matrices $M_1$, $M_2$, $M_3$, $M_4$ of group G are connected to a single line channel or line common channel 28 which leads opposite a line radioactivity detector $T_y$ selectively sensitive to the presence of the fission products, return of the coolant fluid toward the reactor (if the fluid is recycled) taking place through return conduit $28r$;

And all the output channels 29 of the column selectors $S_x$ of all the matrices $M_1$, $M_2$, $M_3$, $M_4$ of group G are connected to a single column channel or column common channel 30 opening opposite a column radioactivity detector $T_x$ selectively sensitive to the presence of the fission products, return of the coolant fluid toward the reactor (if the fluid is recycled) taking place through a return conduit 30r.

The indications supplied by detectors $T_y$ and $T_x$ are delivered through conductors $31y$, $31x$, respectively, to a control unit U which will be hereinafter described in detailed fashion with reference to FIG. 3 and which may for instance comprise the following elements:

Two recording and signalling systems $t_y$ and $t_x$ recording the indications supplied by detectors $T_y$ and $T_x$ respectively (possibly after comparing them with reference indications as hereinafter explained) and sending, through conductors $32y$, $32x$, a threshold overstepping signal when the measured radioactivity exceeds a predetermined value in one or the other of channels 28, 30;

Two cyclic switching elements $s_y$ and $s_x$ respectively controlling the switching of selectors $S_y$ and $S_x$ as diagrammatically shown by lines $34y$ and $34x$, these elements being preferably provided with means for indicating the position of selectors $S_y$, $S_x$ in such manner as to indicate respectively the column and the line actually supervised at any time by detectors $T_y$ and $T_x$;

And a control logical unit W which, in accordance with an indication that the threshold has been overstepped, as supplied by $t_y$ or $t_x$, controls, through conductors $33y$ and $33x$, the switching means $s_x$ and $s_y$ in such manner so as to stop the normal operation of one of them when the threshold has been exceeded as indicated by the associated detector $T_y$ or $T_x$.

Automatic control of selectors $S_y$ and $S_x$ will be described hereinafter in detailed fashion with reference to FIG. 3 where elements $t_y$, $t_x$, W, $s_y$, $s_x$ of unit U are disclosed. However it should be well understood that instead of an automatic control, it is possible to make use of a manual control of selectors $S_y$, $S_x$ according to a preestablished program and to the indications supplied by detectors $T_y$, $T_x$ as it will now be explained.

As above indicated, in the method according to the invention for supervising elementary collection matrices $M_1$, $M_2$, $M_3$, $M_4$ the outputs of which are balanced as mentioned in Patent No. 1, there is effected, in normal operation, both a line by line scanning and a column by column scanning by acting cyclically upon selectors $S_y$ and $S_x$, either manually, or through unit U as hereinafter described with reference to FIG. 3.

Advantageously, selectors $S_y$ and $S_y$ are controlled so that the line by line scanning $(a, b, c, d \ldots)$ and the column by column scanning $(A, B, C, D \ldots)$ are effected simultaneously, at a given time, on two matrices different from each other.

FIG. 1 shows in solid lines line b of matrix $M_1$ and column B of matrix $M_3$ which are supervised at the same time, the selector $S_y$ of matrix $M_1$ sending to detector $T_y$ the effluents of the collecting tubes 22 of line b of matrix $M_1$, whereas the selector $S_x$ of matrix $M_3$ sends to detector $T_x$ the effluents of the collecting tubes 22 of column B of matrix $M_3$.

As a rule, the offsetting between the matrices of the same group that are simultaneously supervised is equal to $p/2$ if $p$ is an even number and to $p \pm 1/2$ if $p$ is an odd number ($p$ being the number of matrices in a group).

This normal line by line and column by column scanning goes on as long as detectors $T_x$ and $T_y$ do not detect any excessive radioactivity.

A defective channel, that is to say a channel where a fuel can is cracked, is detected, according to the circumstances, either by detector $T_x$ or by detector $T_y$ indicating a radioactivity above a given threshold. Once this has been detected, the operation of the selectors ($S_y$) associated with the detector (such as $T_y$) having detected an excess of radioactivity is stopped in such manner that the line or column (for instance line b of matrix $M_1$) where a defective channel has been detected keeps being supervised permanently, scanning going on with the other detector (for instance detector $T_x$ which keeps scanning column by column all the matrices of the group).

Indication of the exact location of the defect is obtained when the radioactivity threshold is indicated as being exceeded by the other detector. For instance, if detector $T_y$ has detected a defect in line b of matrix $M_1$, when detector $T_x$ detects a defect in column C of matrix $M_1$, the exact location of the defective channel 7 is known. After this, the detector, such as $T_y$, which has been the first to detect a defect, keeps supervising the same line or column (in this case line b of matrix $M_1$, selectors $S_y$ being no longer operated), whereas the other detector keeps scanning column by column or line by line (in this case column by column, selectors $S_x$ still being cyclically switched) the radioactivity in the respective collecting tubes.

It will be noted that if another defect appears in the column (in this case column C of matrix $M_1$), corresponding to the defective channel already identified, this new defect can be detected only if special precautions are taken. For instance, if it is supposed that the first defect occurs in channel 7 of matrix $M_1$, under supervision of the line detector $T_y$, and if the new defect occurs in channel 11, this defect will be hidden when the scanning by detector $T_x$ arrives to column C, because this new defect can hardly be distinguished from the first one.

This is why it is advantageous, during operation, after a defect has been detected, periodically to reverse, for the lines and for the columns, the functions of continuous supervision of the defective channel and of scanning supervision of the other channels.

Thus, in the example that is considered, the channel 7 of matrix $M_1$ (where a defect has occurred) will be subjected alternately to supervision in line b by detector $T_y$ and in column C by detector $T_x$. In this way, another can burst occurring for instance in channel 11, will be identified during the line by line scanning when the line c of matrix $M_1$ is connected through its selector $S_y$, to detector $T_y$.

Besides it will be pointed out that the simultaneous occurrence of more than two defects can practically never take place, the presence of two simultaneous defects being already extremely rare.

It should be noted that when use is made of radioactivity detectors comprising in their associated electronic chains (in particular in systems $t_x$ and $t_y$), memory devices and comparison means for determining the evolution of radioactivity as time goes on owing to a taring taking into account the past radioactivity, possibly by entering into account the total power of the reactor, due to the fact that the normal radioactivity of the coolant fluid issuing from each channel of a reactor depends upon this power—as indicated for instance in Patent No. 2 and in the article by Messrs. Goupil, Graftieaux and Servent, published in pages 413 to 426 of tome I of "l'Electronique nucléaire," International Symposium, organized by the Society of Radio Electricians, Paris 1958 (published by the Agence Internationale de l'Energie Atomique, Vienna, 1959)—the line detectors $T_y$ and column detectors $T_x$ are constantly tared, which permits an immediate detection of a defect, both in a line and in a column.

In a modification of the method considered with reference to FIG. 1, it is possible to scan first all the lines of matrices $M_1$, $M_2$, $M_3$, $M_4$ of group G with for instance detector $T_y$, then all the columns of these matrices with detector $T_x$, and so on by alternate cycles line by line and column by column, the detectors being also permanently tared in this modification. When a defect occurs, as indicated for instance first by $T_y$, this detector performs a permanent supervising "follower" function by remaining branched on the line where the defect has occurred, whereas the other detector performs a normal column by column scanning function to indicate the defective channel and to detect any other new defect (with the exception of those that would occur in the same column as the initial defect).

It will be noted that the operation according to the present modification has exactly the same advantages as that above described; however, the time of scanning is doubled at the beginning due to the fact that at any time only one detector is used (alternately $T_y$ and $T_x$) to perform scanning, but this time remains constant even after a defect has been detected because scanning goes on with a single detector after this detection (whereas on the contrary, in the first described embodiment, the duration of scanning is doubled after detection of a defect, because after this detection only one radioactivity detector is used instead of the two detectors acting on the matrices having numbers differing by $p/2$ or $p \pm 1/2$ used before this detection). This modification is interesting in the case of small reactors for which it suffices to have a single matrix to constitute a can burst detection device.

In another modification, we make use, as illustrated by FIG. 2, of a supplementary selector $S_r$ for every matrix and of a supplementary detector $T_r$. In this embodiment of the invention, the same reference numerals have been used for equivalent elements as in FIG. 1.

The other differences between the embodiments of FIGS. 1 and 2 are as follows:

In every column header pipe 26 there is provided a three-way valve V which permits of sending the fluid circulating in this column header pipe either to the corresponding selector $S_x$ as in the embodiment of FIG. 1, or toward the assoicated selector $S_r$ (through header pipes 26r); the output channels 36 of all the selectors $S_r$ lead to an auxiliary single channel 37 which opens opposite detector $T_r$ analogous to detectors $T_y$ and $T_x$.

Valves $V_x$ and $V_{rx}$ permit of connecting channel 30 either with detector $T_x$ as in FIG. 1, or with detector $T_r$ through channel 37, whereas valves $V_y$ and $V_{ry}$ permit of connecting channel 28, either with detector $T_y$ as in FIG. 1, or with detector $T_r$ through channel 37.

Finally a valve $V_r$ is provided in channel 37 downstream of the opening of all the output channels 36.

In order to carry out the method according to the invention in the case of FIG. 2, initially the three-way valves V are set in such manner as to send the effluents from collecting tubes 22 to selectors $S_x$, valves $V_x$ and $V_y$ are opened, whereas valves $V_{rx}$, $V_{ry}$ and $V_r$ are closed. Therefore, selectors $S_r$ and detector $T_r$ are out of circuit and the arrangement is similar to that of FIG. 1.

When a defect has been detected, detector $T_r$ is used to "follow" the evolution of this defect, by permanently branching the column in which said defect has occurred on this detector. This branching is obtained by acting upon the valve V corresponding to this line so as to send the effluent of this line to selector $S_r$, which is brought into the position where it places the header pipe 26r of said column in communication with the output channel 36, and by opening valve $V_r$. This separates the follower function performed by a header pipe 26, a header pipe 26r, an output channel 36, the single auxiliary channel 37 and the auxiliary detector $T_r$ from the scanning function performed by selectors $S_x$ and $S_y$ and detectors $T_x$ and $T_y$ as above.

Furthermore, the supplementary detector $T_r$ may be used as emergency detector in case of failure of one of the detectors $T_r$ or $T_y$. For this purpose, it suffices (valve $V_r$ being closed), when detector $T_x$ has broken down, to close valve $V_x$ and to open valve $V_{rx}$ and, on the contrary, when $T_y$ has broken down, to close valve $V_y$ and to open valve $V_{ry}$. Thus this permits of obtaining the arrangement of FIG. 1, $T_r$ replacing $T_x$ or $T_y$ as the case may be, and it is possible to obtain the operation described precedingly with reference to FIG. 1.

It should be well understood that the preferred applications of the method above described with reference to FIGS. 1 and 2 may be obtained either with manual control of selectors $S_x$, $S_y$, or preferably automatically owing to a control unit U. A preferred embodiment of this unit U is illustrated by FIG. 3 where the same reference numerals have been used as in FIG. 1 to designate identical or equivalent elements, but where the portion disposed inside shield 21 has not been reproduced so as to simplify the drawing.

Every radioactivity detector $T_x$ and $T_y$ comprises, in the usual manner, a radiation detector proper $41x$, $41y$ (for instance a scintillation detector constituted by a scintillator and a photomultiplier tube), a preamplifier and amplifier unit $42x$, $42y$, an electronic unit $43x$, $43y$ performing the functions of discrimination (of the pulses in amplitude in order to select the pulses emitted in response to the presence of fission products) and of determination of the rate of counting in such manner as to feed into conductor $31x$, $31y$ a current which is a function of the intensity of the radioactivity (due in particular to the presence of fission products) opposite the detector proper $41x$, $41y$. Elements 41, 42 and 43 are well known to persons skilled in the art and a detailed description thereof will be found in the book by Sharpe and Taylor "Mesure et détection des rayonnements nucléaires," Dunod, 1958.

As above indicated, means are advantageously provided for taring the indications of every detector $T_x$, $T_y$ in such manner as to determine the variations of radioactivity, and therefore of concentration in fission products, by entering into account the power of the reactor owing to a memory device $44x$, $44y$ (for instance of the magnetic type) and to a comparator $45x$, $45y$ which measures the difference between the value of radioactivity, at a reference time, for every line or column (value recorded in the memory device $44x$, $44y$), and the present radioactivity for the same line or the same column, arriving from unit $43x$, $43y$ through conductor $31x$, $31y$. A switch $46x$, $46y$ permits of storing at the reference time the reference value in memory unit $44x$, $44y$ (position of the switch shown in dotted lines), then of effecting the taring operation in comparator $45x$, $45y$ (position in solid lines of the switch). A recorder $47x$, $47y$ records (curve $48x$, $48y$) the variations of radioactivity for the respective columns and the respective lines and, when the radioactivity threshold indicated by a contact $49x$, $49y$ is exceeded, it sends a signal through conductors $32x$, $32y$ respectively.

Systems $t_x$ and $t_y$, and in particular memory and comparison units (account being taken of the power of the reactor) are described in detailed fashion in the above mentioned Patent No. 2 and in the above mentioned article of Messrs. Goupil, Graftieaux and Servent.

The possible signals indicating that the threshold has been exceeded arrive through lines $32x$ and $32y$ into the logical unit W which essentially comprises, in addition to a clock 50, coincidence circuits or AND-gates and negation circuits or NOT-circuits. It is known that AND-gates comprise at least two inputs (in unit W they comprise only two inlets) and an output which supplies current only when all the inputs are simultaneously fed with current, whereas NOT-circuits have an input and an output, the output supplying current only when the input is not fed with current and inversely.

Every line $32x$ and $32y$ controls the first input of a AND-gate $51x$ and $51y$ having two inputs, the output of which is connected to the input of a NOT-circuit $52x$, $52y$, respectively. The output of circuit $52x$ is connected with the second input of AND-gate $51y$, whereas the output of circuit $52y$ is connected to the second input of AND-gate $51x$.

Unit W also comprises two AND-gates $53x$ and $53y$ having two inputs the first of which is fed from the output of the NOT-circuit $52x$, $52y$ respectively and the second input of which is connected with the output of a clock 50 supplying pulses at equal time intervals, for instance a pulse on every minute when the scanning of every line or of every column requires one minute (this duration of one minute is quite suitable to obtain an accurate measurement of radioactivity). The outputs of AND-gates 53x, 53y are connected, through lines 33x, 33y, with cyclical switch elements $s_x$ and $s_y$ respectively.

Every cyclical switch element comprises a drum 54x, 54y divided into $p$ sections (that is to say into as many sections as there are matrices in every group), every section comprising $n+1$ cams 55 ($n$ being the number of lines and columns in every matrix). In the drawing, the drums are divided into four sections and carry five cams (55a, 55b, 55c, 55d, 55o for drum 54y and 55A, 55B, 55C, 55D and 55O for drum 54x. The cams are offset by $360/np$ degrees.

Every drum is driven in a step by step fashion by a device 56x, 56y every time this device receives a pulse from gate 53x, 53y respectively.

The cams 55 of every drum 54x, 54y cooperate with $p$ contacts 57 (in this case four contacts $57_1$, $57_2$, $57_3$, $57_4$) angularly offset by $360/p$ degrees, in such manner that every contact 57 is closed $n+1$ times (in this case five times) for every complete revolution of the drum (once for every cam 55). Every contact 57 is disposed in a line 58 comprising in series therewith, between the positive terminal 59 and the negative terminal 60 (of a current source which is not shown), a device 61 controlling the step by step advance of a selector $S_x$ or $S_y$ respectively.

Devices 56x, 56y and 61 are analogous and are well known to anyone skilled in the art. They are for instance of the type including an electro-magnet acting through a ratchet-wheel. They rotate through a given angle the associated parts or elements (drum 54x, 54y for device 56x, 56y, or selector $S_x$, $S_y$ for device 61) in response to a pulse received in such manner as to produce the step by step advance, of $1/pn$ turn (in this case $\frac{1}{16}$ turn) of drum 54x, 54y, or of $1/n+1$ turn of the movable tube 62 of selector $S_x$, $S_y$, this movable tube being capable of occupying $n+1$ (five) positions, to wit $n$ in which it places one of the header pipes 26, 24 in communication with the output channel 29, 27 and a supplementary position (shown in solid lines) where it places no header pipe in communication with this channel.

Thus:

Gates 53x and 53y send the step by step advance pulses for drums 54x and 54y respectively, Contacts $57_1$, $57_2$, $57_3$, $57_4$ controlled by the rotation of drum 54y send the step by step advance pulses for the selectors $S_y$ of matrices $M_1$, $M_2$, $M_3$ and $M_4$ respectively, the cams 55 of drum 54y closing one or two of these contacts when this drum rotates through one pitch.

Contacts $57_1$, $57_2$, $57_3$, $57_4$ controlled by the rotation of drum 54x send the step by step advance pulses for the selectors $S_x$ of matrices $M_1$, $M_2$, $M_3$, $M_4$ respectively, the cams 55 of drum 54x closing one or two contacts when this drum rotates through one pitch.

In order to indicate the line, on the one hand, and the column, on the other hand, where scanning is taking place at any time, there is provided on the shaft 63x, 63y of every drum 54x, 54y a signalling device constituted for instance by two rollers 64x–65x, 64y–65y respectively, roller 64x–64y being driven in synchronism with drum 54x, 54y (being for instance keyed on the same shaft 63x, 63y as said drum), whereas a clutch 66x, 66y is provided between the rollers 64 and 65 of a given drum 54x, 54y. Normally, this clutch 66x, 66y is in active position so as to drive in synchronism the rollers 64 and 65 of the same drum; however, the two clutches 66x and 66y are simultaneously disengaged when a signal indicating that the threshold is exceeded is present on the two lines 32x and 32y through a AND-gate 67 having its two inputs fed through lines 32x and 32y and the output of which controls the disengagement of the two clutches.

Rollers 64x, 64y, 65x, 65y carry on their periphery $pn$ different indications which permit of reading, through windows 68x, 68y, 69x, 69y, the column (or the line) corresponding to the present position of the drum 54x, 54y or to the disengagement of the clutch.

It is also possible to have recourse to a signalling device of the type described in the Belgian patent of assignee, No. 575,007, filed January 22, 1959, and corresponding to U.S. patent application Ser. No. 789,146, now U.S. Patent 3,093,003, filed January 26, 1959. The operation of the device of FIG. 3 is as follows:

Initially, supposing drums 54x and 54y to be in the position shown by FIG. 3, the first pulse sent by clock 50 to the AND-gates 53y, 53x has for its effect to rotate through one pitch ($\frac{1}{16}$ of a revolution when $p=4$ and $n=4$) drums 54x and 54y, in view of the fact that the AND-gates 51x, 51y do not transmit current (they do not receive signals indicating that the threshold is exceeded through lines 32x, 32y) and that the NOT-circuits 52x and 52y still supply current. When rotating through one pitch, the cams 55a and 55A of drums 54y, 54x close the two contacts $57_2$ when passing from one position to the other. This produces an advance of one pitch ($\frac{1}{5}$ of a revolution when $n=4$) of the selectors $S_x$ and $S_y$ of matrix $M_2$ which connect the line $a$ of matrix $M_2$ to detector $T_y$ and the column A of matrix $M_3$ to detector $T_x$. At the same time, the two contacts $57_1$ have been closed by the cams 55o of the drums 54y, 54x, so that the selectors $S_y$, $S_x$ of the matrix $M_1$ are brought into the position in solid lines where the output channels 27 and 29 of this matrix $M_1$ are not fed with current.

On every minute, the switching elements $s_y$ and $s_x$ turn through one pitch and successively scan lines $b$, $c$, $d$ and columns B, C, D of matrix $M_2$ by the closing of contacts $57_2$ by cams 55b, 55B; 55c, 55C; and 55d, 55D. On the fifth pulse, the fifth cams 55o once more close contacts $57_2$ and cause the selectors $S_x$ and $S_y$ of matrix $M_2$ to shift into closing position, whereas the first cams 55a, 55A close contacts $57_3$ and therefore cause the selectors $S_y$, $S_x$ of matrix $M_3$ to shift into opening position for line $a$ and column A. The operation goes on in the same manner and after $p \cdot n$ minutes the cycle is repeated as long as no signal indicating that the threshold has been exceeded is received by detector $T_x$, $T_y$. In order to simplify explanations it has been supposed that scanning is effected by lines and by columns simultaneously in the same matrix. As a matter of fact, it is advantageous to operate on two matrices which are different, for instance to scan the lines in matrices $M_1$, $M_2$, $M_3$ and $M_4$ whereas the columns are scanned in matrices $M_3$, $M_4$, $M_1$, $M_2$, respectively. For this purpose, it suffices initially to offset the position of drum 54x by 180° so that on the first pulse cam 55A closes the contact $57_4$ of drum 54x.

When the threshold has been exceeded for a particular line or column, the corresponding detectors, for instance $T_x$, sends a signal through conductor 32x. It follows that the AND-gate 51x supplies current (both of its inputs are now fed with current, because 52y supplies current) and that the NOT-circuit 52x is no longer supplying current. AND-gate 53x does not supply current (because one of its inputs is no longer fed with current), and consequently cyclical switching element $s_x$ stops. Detector $T_x$ therefore permanently supervises "in follower fashion" the column in which a defect has occurred and this column is indicated by rollers 64x and 65x visible through their windows 68x, 69x.

On the contrary, line by line scanning goes on, the cyclical switching element $s_y$ being still fed with current because NOT-circuit 52x and conductor 32y do not feed current to AND-gate 51y.

When detector $T_y$ is branched on the line where the defective channel is located, conductor 32y is supplying current and at this time AND-gate 67 is fed at both of its inputs (simultaneous overstepping of the thresholds for $T_x$ and $T_y$). This produces a disengagement of clutches 66x and 66y and therefore a stopping of rollers 65x and 65y which then indicate the two coordinates of the defective channel, visible through windows 69x, 69y.

However, switching of the lines goes on in view of the fact that NOT-circuit 52x is not feeding current and that consequently AND-gate 51y cannot supply current, which permanently feeds current to the first input of AND-gate 53y through NOT-circuit 52y which is supplying current.

From this time on, the defective channel being detected, detector $T_x$ works in follower fashion whereas detector $T_y$ works as a scanning element and permits of detecting a second defect (except if this second defect occurs in the same line as the first one, for reasons above stated), the line in which this second defect occurs being indicated on roller 64y visible through window 68y. In order to be able to detect a defect in the same line as the first defect, it suffices periodically to exchange the "follower and" "scanning" functions of detectors $T_y$ and $T_x$. For this purpose, it is for instance possible to provide circuits which permit of returning into "scanning" function a detector stopped when working in "follower" fashion on a line or on a column, for instance by providing, as indicated in dotted lines at 70x, 70y, a circuit which permits of wilfully short-circuiting (when switch 71x, 71y is moved from the solid lines position to the dotted lines position) NOT-circuits 52x, 52y and to cause switching to be again effected by a drum 54x, 54y (by feeding current to AND-gate 53x, 53y) which was previously stopped to obtain a "follower" function.

The advantages of the method and device according to the invention are as follows:

A reduction of the number of conduits, of switching means and of radioactivity detectors or other fission product detectors, A reduction of the number of passages to be provided in the shield 21 of the reactor, A rapidity and safety of detection in case of a can burst, Permanent taring of the detectors, Flexibility of operation of the matrix system, on the one hand before detection of a defect (simultaneous or alternative analysis by lines and by columns), and on the other hand after detection of a defect (a detector being used as a follower element and the other one as a scanning element, with the possibility of reversing their functions by providing, in the case of FIG. 3, a circuit 70y, 70x which permits of short-circuiting one or the other of the NOT-circuits 52y, 52x), Wholly automatic operation, with simple logical elements, in the case of a device of the type illustrated by FIG. 3.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

In particular, the invention has been stated with reference to a device including "square matrices" for the collecting tubes, but of course it might be applied to any other device which may be considered as a grouping in two sets of coordinates with an equal number of collecting tubes 22 for each of the coordinates.

What we claim is:

1. System for detecting the presence of fission products in the coolant fluid streams emerging from a plurality of channels provided in a heterogeneous nuclear reactor, by monitoring the radioactivity level in said streams, comprising: a plurality of collecting tubes, each having a first extremity located in one of said streams for picking-up a portion thereof and a second extremity, the plurality of second extremities being grouped to form a series of square matrices having each a same number of lines and of columns of second extremities; a multiplicity of line header pipes, one for each line in each matrix; a multiplicity of column header pipes, one for each column in each matrix; a plurality of line collecting channels, each having a first extremity opening in said second extremity of one of said collecting tubes for collecting substantially half of the portion of coolant fluid picked-up thereby and a second extremity ending in one of said line header pipes for delivering therein the collected coolant fluid; a plurality of column collecting channels, each having a first extremity opening in said second extremity of one of said collecting tubes for collecting substantially half of the portion of coolant fluid picked-up thereby and a second extremity ending in one of said column header pipes for delivering therein the collected coolant fluid; a series of line output channels, one for each matrix; a series of column output channels, one for each matrix; a series of line selector means, each connected between the line output channel of one matrix and the line header pipes of the same matrix and adapted to occupy a number of operative positions equal to the number of line header pipes in said matrix, in each of which positions it puts into communication a different one of said line header pipes with said line output channel, plus one non-operative position, in which it does not put into communication any one of said line header pipes with said line output channel; a series of column selector means, each connected between the column output channel of one matrix and the column header pipes of the same matrix and adapted to occupy a number of operative positions equal to the number of column header pipes in said matrix, in each of which positions it puts into communication a different one of said column header pipes with said column output channel, plus one non-operative position, in which it does not put into communication any one of said column header pipes with said column output channel; a line common channel connected to all line output channels for receiving the fluid output thereof; a column common channel connected to all column output channels for receiving the fluid output thereof; a line radioactivity detector located relatively to said line common channel for monitoring the radioactivity level in the fluid received by said line common channel; a column radioactivity detector located relatively to said column channel for monitoring the radioactivity level in the fluid received by said column common channel; cyclical line switching means for switching, according to a general line switching cycle, one after the other said line selector means each one successively through all of said operative and non-operative positions thereof according to a matrix line switching cycle; and cyclical column switching means for switching, according to a general column switching cycle, one after the other said column selector means each one successively through all of said operative and non-operative positions thereof according to a matrix column switching cycle.

2. System according to claim 1, further comprising control means operating said cyclical line switching means and said cyclical column switching means according to a combined switching cycle of a given duration combining said general line switching cycle and said general column switching cycle, for cyclically controlling on the one hand said cyclical line selector means according to said matrix line switching cycle and on the other hand said cyclical column selector means according to said matrix column switching cycle, in the various matrices considered in a same, arbitrarly chosen, order, and for starting said general line switching cycle for the cyclical line selector means a given period of time after starting said general column switching cycle for the cyclical column selector means, said given period of time being substantially equal to half said duration of a combined switching cycle, thereby controlling substantially simultaneously the switching of the cyclical line selector means, according to said matrix line switching cycle, in a first matrix of said series and of the cyclical column selector means, according to said matrix column switching cycle, in a second matrix of said series offset with respect to said first matrix by a number of matrices substantially equal to the half of the number of matrices in said series of matrices.

3. System according to claim 1, wherein said cyclical line switching means are adapted, in response to a received control pulse, to switch said line selector means to bring into communication the next line header pipe according to said matrix line switching cycle with said line output channel connected thereto, whereas said cyclical column switching means are adapted, in response to a received control pulse, to switch said column selector means to bring into communication the next column output channel according to said matrix column switching cycle with said column output channel connected thereto, and further comprising a synchronizing clock adapted to deliver control pulses at regular time intervals, a first and a second controlled transmission circuits, said first transmission circuit being inserted between said clock and said cyclical line switching means and said second transmission circuit being inserted between said clock and said cyclical column switching means, said transmission circuits being normally biased to transmit said control pulses to each of said cyclical switching means, a first and a second control circuits operatively connected with said line radioactivity detector and said column radioactivity detector, respectively, said control circuits being adapted, in response to only a first signal indicative of overstepping of the radioactivity level threshold supplied by the associated detector, of controlling said first and second controlled transmission circuits respectivly, so as to stop the transmission of said control pulses toward the associated transmission circuit.

4. System according to claim 3 further comprising two means for indicating the position of the line and column selectors respectively, each of said indicating means comprising a first rotary member driven in synchronism with a movable element of the cyclical switching means, a second rotary element, clutch means for normally coupling said second rotary element in synchronism with said first rotary element, said clutch means being normally engaged and a control circuit capable, in response to two signals indicative of an overstepping of the radioactivity level threshold produced simultaneously by said two detectors, of simultaneously disengaging the clutch means of said two signalling means.

References Cited in the file of this patent

UNITED STATES PATENTS 2,939,953    Parsons et al. _____ June 7, 1960

FOREIGN PATENTS 219,184     Australia _____ Nov. 28, 1958

OTHER REFERENCES

WAPD-BT-3 (Atomic Energy Commission), "The Theory of Failed Fuel Element Location and Detection," P. W. Frank and K. H. Vogel; Bettis Technical Review, vol. 1, No. 3, pp. 98–109, August 1957.